United States Patent [19]

Bovagne

[11] 4,105,067
[45] Aug. 8, 1978

[54] DEVICE FOR LOCATING A LAYER OF TUBES IN AN ENCLOSURE

[75] Inventor: René Bovagne, Chalon-sur-Saone, France

[73] Assignee: Creusot-Loire, Paris, France

[21] Appl. No.: 792,302

[22] Filed: Apr. 29, 1977

[30] Foreign Application Priority Data

Jun. 16, 1976 [FR] France .............................. 76 18250

[51] Int. Cl.² .............................................. F28F 1/12
[52] U.S. Cl. ................................... 165/159; 165/162; 165/175; 228/173 C; 228/183; 428/594; 428/597; 428/593
[58] Field of Search ............................ 29/282; 269/43; 228/183, 57, 212, 173 C; 165/172, 173, 175, 159, 162; 428/594, 597, 598, 593; 248/68 R

[56] References Cited

U.S. PATENT DOCUMENTS

| | | | |
|---|---|---|---|
| 1,630,459 | 5/1927 | Zeidler | 428/597 X |
| 1,730,470 | 10/1929 | Modine | 228/183 X |
| 3,008,551 | 11/1961 | Cole | 428/594 X |
| 3,104,218 | 9/1963 | Speidel et al. | 165/162 X |
| 3,340,023 | 9/1967 | Hulsey | 428/594 X |
| 3,442,763 | 5/1969 | Chetter et al. | 165/162 X |
| 3,869,778 | 3/1975 | Yancey | 428/593 |
| 3,998,268 | 12/1976 | Sagan | 165/172 X |

FOREIGN PATENT DOCUMENTS 488,054  1/1976  U.S.S.R. .................................. 165/172

Primary Examiner—Al Lawrence Smith
Assistant Examiner—K. J. Ramsey
Attorney, Agent, or Firm—Haseltine, Lake & Waters

[57] ABSTRACT

A layer of tubes is located in an enclosure using a device comprising a pair of parallel strips arranged one on each side of the layer of tubes in a plane transverse to the axes of the tubes, the strips being connected together by tongues which extend from a respective strip towards the other strip, the tongues being inclined to the strips and adjacent tongues of each strip being inclined in opposite directions.

8 Claims, 6 Drawing Figures

DEVICE FOR LOCATING A LAYER OF TUBES IN AN ENCLOSURE

FIELD OF THE INVENTION

The invention relates to a device for locating a layer of tubes in an enclosure, the tubes being substantially parallel over at least part of their length.

The invention is particularly but not exclusively applicable to the manufacture of heat exchangers, and in particular to the manufacture of steam generators for nuclear power stations.

PRIOR ART

In power stations and especially in nuclear power stations, the electrical power is produced by heating a primary fluid in a reactor and transferring heat from the primary fluid to a secondary fluid which is vaporized in order to drive turbines.

Steam generators consist of a cylindrical enclosure in which are disposed layers of tubes through which the primary fluid flows, the secondary fluid surrounding the outside of the tubes. To enable the tubes to expand, they are usually U-shaped, being passed through a single and-plate at the base of the cylindrical enclosure.

This arrangement has various disadvantages. One disadvantage is that the heat exchanger is not of the counterflow type, and the top of the U-shape of the tubes, where the steam is formed, is not the hottest part, since the primary fluid has already travelled some distance from the end-plate.

Counterflow type heat exchangers have been proposed, including a cylindrical enclosure with an end-plate at each end, through which the heat exchanger tubes pass. This arrangement is preferable from the thermal point of view, but eliminates the bend in the tubes which enables them to expand. To overcome this disadvantage, the tubes may be curvilinear. With this arrangement the tubes have regularly spaced rectilinear portions parallel to the generatrices of the enclosure, on which devices for locating the tubes bear.

The tubes have curved portions between the rectilinear portions which allow for expansion.

This is a good arrangement as far as locating the tubes is concerned, but has the disadvantage that it considerably complicates the manufacture of the heat exchanger, as it is impossible to slide the tubes one-by-one through the end-plates and the locating devices, because the tubes are not straight.

SUMMARY OF THE INVENTION

According to one aspect of the invention there is provided a device for locating a layer of tubes in an enclosure, the tubes being substantially parallel over at least part of their length, the device including a pair of parallel strips to be arranged one on each side of the layer of tubes in a plane transverse to the axes of the tubes, wherein said strips of said pair of strips are adapted to be connected together by a plurality of tube-locating tongues which extend from one of said strips towards the other of said strips, said tongues being inclined relative to said strips and adjacent tongues of each strip being inclined in opposite senses.

In a preferred embodiment of the invention the tongues consist of a rectangular portion of the strips which are cut out on three sides and bent out along the fourth side, at which they remain attached to the body of the respective strip.

In another aspect of the invention there is provided a method of locating a plurality of layers of tubes in an enclosure using a plurality of tube-locating devices as described above wherein the outer strip of a pair of strips of a first device is fixed to the wall of the enclosure, tubes are then positioned in the spaces between the tongues, the inner strip with its tongues opposed to those of the first strip is then positioned over the tubes, the two sets of tongues then being spot-welded together, a strip of a second device is then spot-welded to said inner strip of said first device, the tubes of the second layer are then positioned between the tongues, and the second strip of the second device is then attached by welding together the tongues, the above steps being repeated for the third and subsequent layers.

BRIEF DESCRIPTION OF THE DRAWINGS

The invention will be more fully understood from the following description of an embodiment thereof given by way of example only, with reference to the accompanying drawings.

In the drawings:

FIG. 6 is a partial transverse cross-section through the generator of FIG. 1.

DETAILED DESCRIPTION

Figure 1:
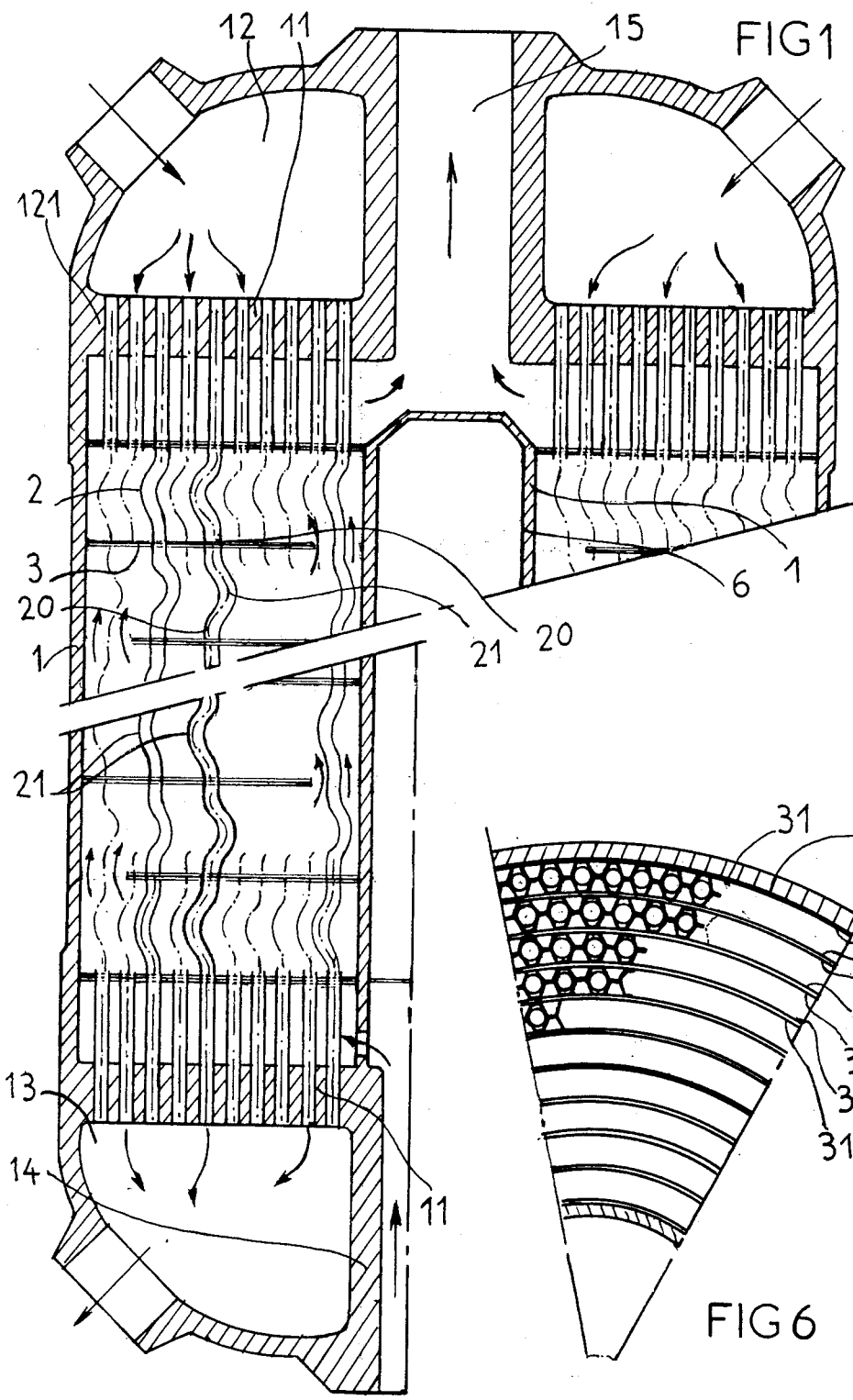
FIG. 1 is a partial axial cross-section through a steam generator including an embodiment of a tube-locating device in accordance with the invention.

The generator shown in FIG. 1 basically consists of a cylindrical enclosure 1 closed at each end by an end-plate 11 outwardly of which are a chamber 12 for supplying primary fluid and a chamber 13 for removing the primary fluid. The secondary fluid is delivered to the enclosure 1 through an axial conduit 14 and leaves the upper part of the enclosure through a conduit 15. The primary fluid passes from the supply chamber 12 at the top to the removal chamber 13 at the bottom through tubes 2 which are disposed in layers inside the enclosure 1. As has already been explained for proper location of the assembly, the tubes 2 are connected to the wall of the enclosure 1 by means of devices 3 which are spaced apart at regular intervals. At the positions of the devices 3, the tubes 2 have rectilinear portions 20 which are parallel to the generatrices of the enclosure 1. Between these rectilinear portions 20 are curved portions 21, successive curved portions lying on opposite sides of the axis of a respective tube, so that each tube is of generally sinusoidal form and can deform on expansion by virtue of the curved portions 21, while being properly located in the enclosure by the locating devices 3 which bear on the rectilinear portions 20.

It will be immediately apparent that placing the tubes in the enclosure is no simple matter, and certainly cannot be done in the conventional way.

Figure 5:
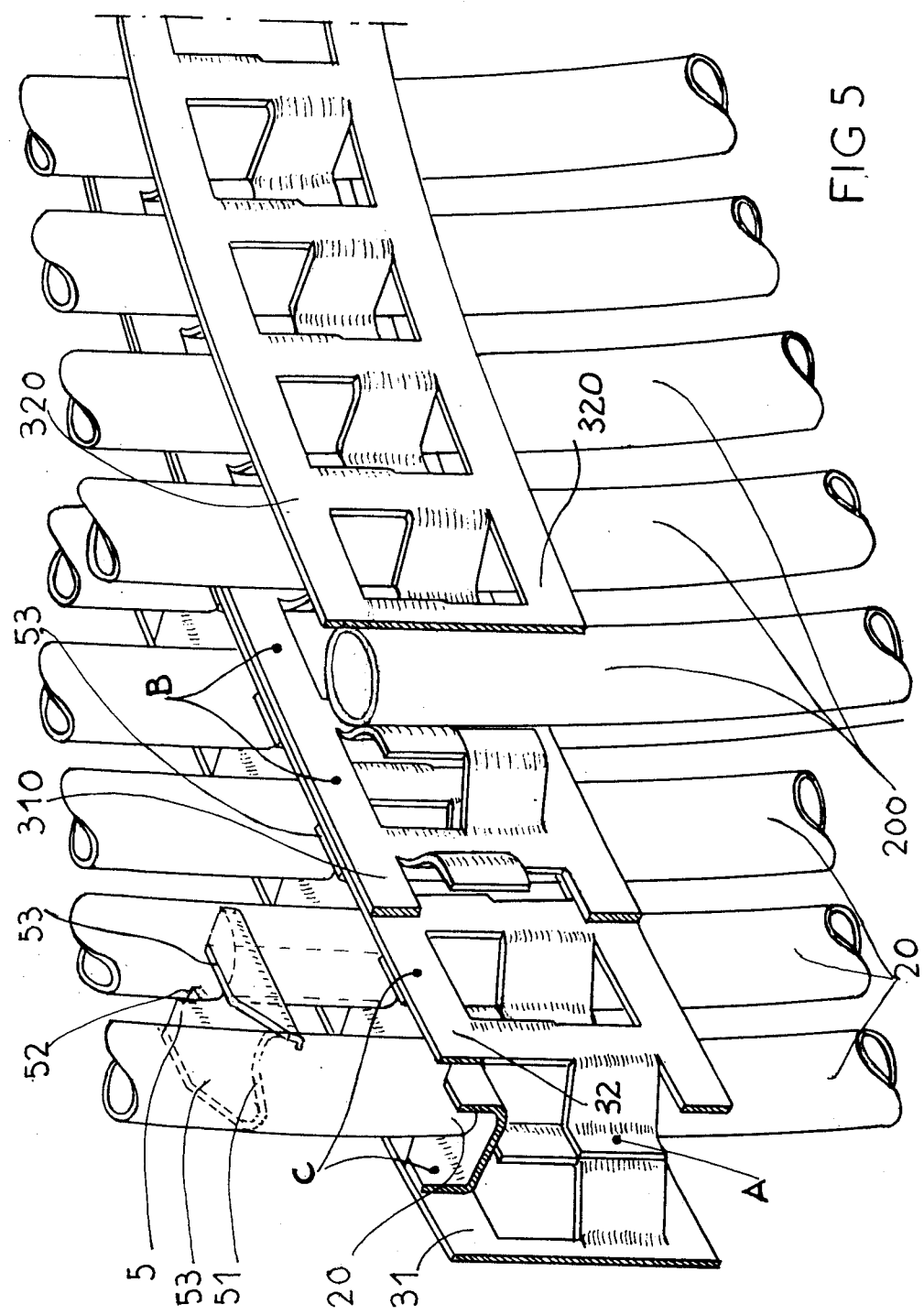
FIG. 5 is a partial perspective view showing use of two devices for locating two parallel layers of tubes.

The problem of placing the tubes in the enclosure can be solved as follows. The rectilinear portions 20 of the tubes of a given layer are gripped between two parallel strips, as shown in the form of hoops 31 and 32 (FIG. 5).

Figure 2:
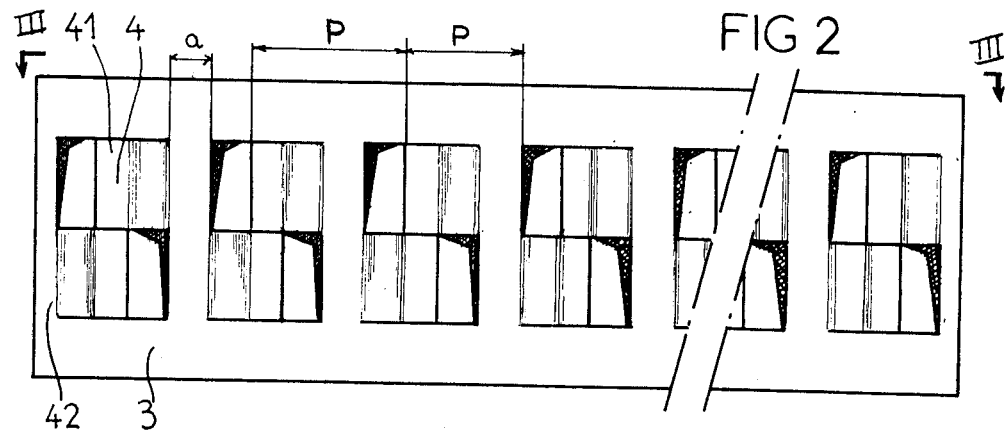
FIG. 2 is a front view of a part of the device of FIG. 1.
Figure 3:
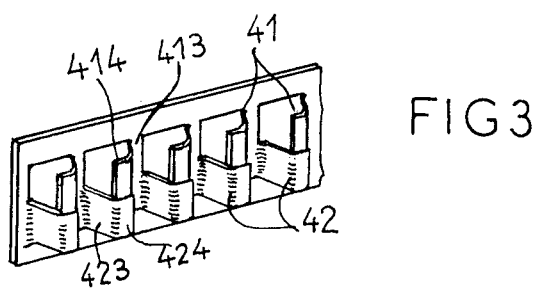
FIG. 3 is a perspective view of the part of the device of FIG. 2 before final shaping.
Figure 4:
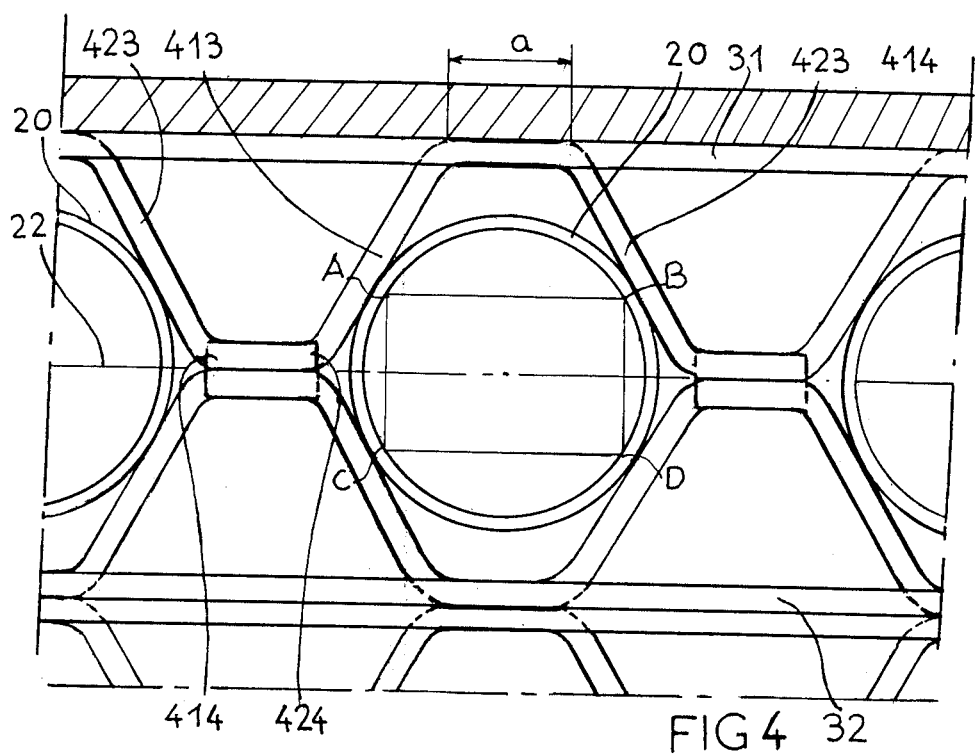
FIG. 4 is a plan view of part of a layer of tubes fitted with a locating device in accordance with the invention.

FIGS. 2 to 4 show one form of hoop in the flat (before final shaping). The hoop consists of a flat rectangular strip to which is attached a plurality of regularly spaced tongues. The distance P between successive tongues corresponds to the distance between the tubes at the rectilinear portions.

As can be seen in FIGS. 3 and 4, each tongue extends away from the hoop to which it is attached in a direction inclined to the hoop. Each hoop has two rows of tongues 41 and 42 arranged one above the other. The tongues of row 41 are inclined towards the left as seen in FIG. 4, and those of row 42 are inclined in the opposite direction i.e. towards the right as seen in FIG. 4.

The tongues consist of shaped rectangles attached to the hoops along one edge. The tongues will usually be formed by stamping, being cut out along three edges and bend away from the body of the hoop, to which they are attached by the uncut forth edge. Preferably, and as shown in FIG. 4, each tongue has an inclined portion 413 (423) with an end portion 414 (424) parallel to the body of the hoop 3.

The hoops can therefore be mass-produced preferably in the flat, for final shaping by being curved to the required diameter (if the enclosure is cylindrical, that is).

As can be seen in FIGS. 3 and 4, the tongues of the two rows are symmetrically inclined so that the end portions 414 of the tongues of the top row and the end portions 424 of the bottom row of tongues are side-by-side with their outer surfaces in a plane 22 parallel to the hoop and passing through the axes of the tubes 20. It will be understood that as a result of this arrangement an identical hoop with tongues extending in the opposite direction may be situated on the other side of the tubes, the end portions of the tongues of the two hoops bearing on one another. In this way four tongues of the two hoops form a substantially hexagonal space which is symmetrical with respect to the plane 22 which passes through the axes of the tubes 20. The size and inclinations of the tongues are so chosen that the circular perimeter of each tube can be inscribed in the hexagonal boundary of this space, and the tube will bear on the inclined portions of the tongues at four points A, B, C and D which define a rectangle. This arrangement provides totally adequate location of the tube, and it is preferable for the tube not to touch the bodies of the hoops, as it would if the tongues were to define a regular hexagon. In this preferred arrangement, the shape of the tongues is such that the inclined portions are longer than the distance $a$ separating the tongues (FIG. 2), which corresponds to the base of the hexagon. As the tongues have a certain degree of elasticity, once the first hoop 31 has been attached, each of the tubes 20 can be placed in the V defined by the oppositely inclined portions 413 and 423 of the tongues of the top and bottom rows. Once the tubes are in position, the second hoop 32 can be fitted, its tongues 431 and 432 completing the hexagons around the tubes, the end portions of the tongues bearing on one another. It is a simple matter to connect the hoops by spot welding together the end portions of the tongues which bear on one another.

The same procedure can be employed with several parallel layers of tubes, as shown in FIGS. 5 and 6, for the case of a cylindrical enclosure.

FIG. 5 shows two parallel layers. When the hoops 31 and 32 of the first layer have been fixed together by spot welding the end portions of the tongues as described above at A, further hoop 310 which is identical to the hoop 31 is put in position and spot welded at B, to the hoop 32. The tubes of the second layer are then fitted in place, and the assembly is completed, in the manner already described, by a further hoop 320 which is identical to the hoop 32, the end portions of the tongues of the hoops 310 and 320 in contact with one another being spot welded together.

The same procedure may be employed to fix more than two layers in an enclosure as shown in FIG. 6. The tubes are arranged in concentric layers with radii which decrease towards the center of the enclosure. The hoops are first stamped out in straight lengths, to form the inclined tongues, and are then curved to the required radius for their respective positions.

The outermost hoop 31 which has the greatest diameter, is welded directly to the enclosure 1. It will be understood that the hoop is composed of a number of sections arranged end to end.

Once a first complete hoop 31 has been fitted along with corresponding hoops spaced regularly up the height of the enclosure 1, the first layer of tubes 20 is put in place, each tube being passed through the central opening in the generator. The second hoop 32 is then fitted, this also being made up of sections arranged end to end.

The third hoop 310 is attached to the hoop 32 by spot welding the parts in contact with one another, this third hoop also consisting of sections arranged end to end but staggered relative to the sections of the hoop 32, so that the joins are staggered in the manner shown in FIG. 5.

The second layer of tubes 200 is put in place, the tubes being passed one at a time through the central opening in the generator, as before. The second hoop 320 is then attached, and assembly continues in this manner to the center of the exchangers. It is preferable to place a tube 6 along the axis of the enclosure 1, to guide the secondary fluid along the layers of tubes.

In this type of exchanger it is usual to maximize the distance over which the secondary fluid flows in contact with the tubes. With this in view, the locating devices 3 are at least partially closed to form baffles which force the secondary fluid to flow transversely of the length of the tubes.

The locating device which has just been described can readily be fitted with closure elements 5 situated between the tubes of each layer to form baffles.

Each of the elements 5 is a flat plate with two semicircular notches 51 and 52 facing away from one another and with a diameter and spacing which correspond to the dimensions and separation of the tubes, so that each of the elements 5 fills the space between two adjacent tubes.

Each of the elements 5 is also provided with upstanding edges 53 parallel to the hoops and bearing on the latter. When a layer of tubes surrounded by its pairs of hoops has been fixed in position, a series of these closure elements 5 is fitted, the raised edges 53 being spot welded at C to the hoops. The location device then forms a sealed baffle system which deflects the flow of secondary fluid between the tubes (FIG. 1), openings being left to permit the fluid to pass from one stage to the next.

It will be understood that the invention is not intended to be limited to the details of the embodiment which has just been described, or to the particular application thereof, and that it is intended to cover all variations thereof, particularly those which differ therefrom only in the use of equivalent means within the scope of the appendent claims.

While the tube locating device has been described in a very particular application, i.e. the manufacture of steam generators for nuclear power stations, it is equally applicable to heat exchangers for other applications. Also the device may be used whenever it is required to fix regularly spaced tubes in layers inside any kind of enclosure.

Finally, the device is adaptable to all forms of enclosures, as it basically consists of hoops formed in the flat and then appropriately shaped, the curvature of the hoop and possibly the length and separation of the tongues depending on the position of the hoop within the enclosure.

What is claimed is:

1. An assembly comprising a layer of tubes, said tubes being substantially parallel over at least part of their length and means for locating said tubes, said means comprising a pair of parallel strips arranged one on each side of the layer of tubes in a plane transverse to the axes of the tubes, means connecting said pair of strips together including a plurality of tube-locating tongues which extend from each of said strips towards the other of said strips, said tongues being inclined relative to said strips, adjacent tongues of each strip being inclined in opposite directions such that each tube is engaged by four tongues, said tongues of said strips being connected together to locate said tubes between said strips and connect said strips together.

2. An assembly as claimed in claim 1 wherein each tongue extends from the respective strip to a height corresponding to the level of the axis of the tube which it supports by bearing thereagainst at an intermediate portion of the length of the tongue.

3. An assembly as claimed in claim 1 wherein each of said tongues extends from a respective one of said strips halfway across the space between said strips, the end portion of each tongue being attached to the corresponding end portion of one of said tongues extending in the opposite direction from said other strip, the intermediate portions of said two tongues bearing against two adjacent tubes in the layer.

4. An assembly as claimed in claim 1 wherein each said tongue consists of a rectangular portion of the respective strip cut out along three edges and bent away from said strip, each said rectangular portion being connected to the respective strip along the uncut fourth edge, each strip having two rows of superposed tongues arranged one above the other, the tongues of one of said rows being connected to said strip on the same edges and being inclined to said strip at the same angle, the tongues of the other of said rows being connected to said strip on the opposite edges and inclined to the strip in a manner symmetrical with, but opposite to, those of said one row.

5. An assembly as claimed in claim 1, wherein said four tongues which bear on each tube contact said tube at four points which are situated at the corners of a rectangle.

6. An assembly as claimed in claim 1 comprising a plurality of parallel layers of said tubes in an enclosure, said pairs of strips being successively fastened together, the outermost strip being attached to the enclosure and adjacent strips of adjacent pairs of strips being fastened together.

7. An assembly as claimed in claim 6 further comprising a plurality of baffles for deflecting the flow of fluid around the tubes, each baffle being placed between adjacent tubes of a respective layer and comprising a flat plate with two semi-circular notches through which the tubes will pass and perpendicularly upstanding edges which are welded to the strips locating the tubes.

8. A method of locating a plurality of layers of tubes in an enclosure comprising forming strips with tube locating tongues bent from said strips along the length of the strips, said tongues being bent in two superposed rows in each strip with the strips in one row being bent in one direction of inclination from the strip and the tongues in the other row being bent in the other direction of inclination from the strip, fixing one strip to the wall of the enclosure, positioning a first layer of tubes in spaces between adjacent tongues in the two rows, positioning a second strip with its tongues opposed to those of the first strip and positioned over the tubes, spot welding the two sets of tongues of the two strips, spot welding a third strip to said second strip, positioning the tubes of a second layer between the tongues of the third strip, positioning a fourth strip with its tongues over the tubes of the second layer, and spot-welding the tongues of the third and fourth strips, the above steps being repeated for third and subsequent layers of tubes.

* * * * *